United States Patent [19]
Wood et al.

[11] Patent Number: 6,146,491
[45] Date of Patent: Nov. 14, 2000

[54] LINING OF PIPELINES OR PASSAGEWAYS USING A PUSH ROD ADHERED TO ROD AND LINER

[75] Inventors: Eric Wood, deceased, late of Casteltown, United Kingdom; by Miranda Jane Bull, legal representative, Peel, United Kingdom; by William A. Martin, legal representative, Chesterfield, Mo.

[73] Assignee: Insituform, Netherlands; B.V.

[21] Appl. No.: 08/525,613

[22] PCT Filed: Jan. 20, 1995

[86] PCT No.: PCT/GB95/00110

§ 371 Date: Jul. 27, 1998

§ 102(e) Date: Jul. 27, 1998

[87] PCT Pub. No.: WO95/20125

PCT Pub. Date: Jul. 27, 1995

(Under 37 CFR 1.47)

[30] Foreign Application Priority Data

Jan. 21, 1994 [GB] United Kingdom .................. 9401198

[51] Int. Cl.[7] .............................. F16L 55/18; B29C 63/34
[52] U.S. Cl. ......................... 156/344; 156/294; 156/423; 264/269; 264/516; 138/97
[58] Field of Search .................................... 156/287, 293, 156/294, 344, 423, 584; 264/269, 516; 138/97, 98

[56] References Cited

U.S. PATENT DOCUMENTS

| | | | |
|---|---|---|---|
| 3,294,121 | 12/1966 | Powell et al. .............................. | 138/97 |
| 4,786,345 | 11/1988 | Wood . | |
| 5,108,533 | 4/1992 | Long, Jr. et al. . | |
| 5,395,472 | 3/1995 | Mandich ................................. | 156/294 |

FOREIGN PATENT DOCUMENTS

| | | | |
|---|---|---|---|
| 20147147A | 9/1980 | United Kingdom ..................... | 138/98 |
| 2 244 537 | 4/1991 | United Kingdom . | |
| WO 93/15351 | 5/1993 | WIPO . | |

Primary Examiner—Michael W. Ball
Assistant Examiner—Barbara Musser
Attorney, Agent, or Firm—Cowan, Liebowitz & Latman, P.C.; Michael I. Wolfson, Esq.; Lloyd G. Buchanan

[57] ABSTRACT

The lining of lateral pipelines is effected from the service end by inserting a resin impregnated lining tube into the lateral using a push rod. The leading end of the push rod is attached to the liner by a relaeasble device so that once the liner is in place, and the rod pulled back, the liner detaches and remains in the lateral. The liner is held in folded state by straps which are broken as the rod is pulled back in that a rope attached to the leading end of the rod is trapped under the straps and breaks them one by one as the rod is retracted.

21 Claims, 5 Drawing Sheets

LINING OF PIPELINES OR PASSAGEWAYS USING A PUSH ROD ADHERED TO ROD AND LINER

This invention relates to the lining of pipelines and passageways wherein a liner tube is fed into the pipeline or passageway, and then is inflated onto the pipeline or passageway surface. The liner, which is a flexible tubular structure, includes a layer of resin absorbent material such as a fibrous felt which is impregnated with a curable synthetic resin, and the basis of the lining operation is that when the lining tube is inserted and inflated up to the size of the inner diameter of the pipeline or passageway, the resin is cured so that the flexible liner turns into a rigid lining lying on the pipeline or passageway surface.

This basic technology is now extremely well known, and is practiced throughout the world. The basic idea related to this lining operation is disclosed in U.S. Pat. No. 4,009,063, which discloses that the liner is pulled into the pipeline or passageway and then is inflated using a fluid medium such as air or gas or even a liquid such as water.

U.S. Pat. No. 4,064,211 discloses a modification of the basic idea and in this U.S. patent it is suggested that the liner after impregnation should be everted into and along the passageway using a liquid to perform the eversion and to provide a means whereby the inwardly travelling portion of the liner is buoyantly supported before reaching the everting face.

Modified methods for the insertion and inflation of the liner have also been proposed in the past, and for example in the paper entitled "Inflatable Terylene Reinforced Resin Pipe Linings" by D Rhys-Jones presented at the First International Conference on the internal and external positions of pipes on Sep. 9–11th, 1975 at the University of Durham, England, it is disclosed that the liner may be pulled into the pipeline or passageway, and then an expansion tube or hose is everted into the liner when it has been pulled into the pipeline or passageway and when it is still flexible and flat, in order to inflate the liner up to the pipeline or passageway surface. An advantage of this method which is identified by the description pull-in and inflate is that the expansion tube which is used can be of relatively light weight so that air can be used as the medium for expanding the liner. Additionally, the expansion tube or hose can be withdrawn from the pipeline or passageway after the resin of the liner has cured and the liner has turned into a rigid lining, so that the expansion tube or hose can be reused.

In U.S. Pat. No. 4,786,345, it is explained how this pull-in and inflate system can be used in connection with the lining of what are called lateral pipelines or passageways, being the service pipes which lead from for example domestic dwellings or office buildings to a main line underground sewer.

In the lining of these lateral pipes, difficulties arise because it is not easy to position the liner inside the lateral pipe from inside the main sewer, although a number of attempts have been made to do this as indicated for example in the following patent specifications:

U.S. Pat. No. 4434115
PCT No. GB92/02287
EPA No. 0526521

The present invention is concerned with a method of inserting resin impregnated flexible tubular liners into pipelines and passageways, and in particular those pipelines and passageways such as lateral pipes where access to one end of the pipeline or passageway is difficult.

In accordance with the present invention there is provided a method of lining a pipeline or passageway by means of a length of flexible tubular liner which comprises or includes resin absorbent material which is impregnated with a curable synthetic resin comprises attaching one end, (the leading end). of the liner to one end, the (leading end) of an insertion rod means so that by pushing the rod, leading end first, from one end of the pipeline or passageway to be lined, to the other end of the pipeline or passageway, causes the liner to be pulled into the pipeline or passageway, and wherein the said leading end of the rod is connected to the leading end of the liner by a means enabling the rod to pull the liner into the pipeline or passageway, but when the rod is retracted after the liner is so placed in the pipeline or passageway it will become detached from the liner leaving the liner in position.

Additionally, it is preferred that connected to the leading end of the rod is a rope, cable or the like which extends from the leading end of the rod, when it is at the remote end of the pipeline or passageway, back to the insertion end of the pipeline or passageway, and said rope, cable or the like is trapped under restraining means which serve to hold the flexible liner in a folded condition to which it is moved prior to insertion into the pipeline or passageway, and said rope, cable or like serves to break or sever said holding means when the rod is retracted from the pipeline or passageway enabling the liner subsequently to be expanded.

The said holding means preferably comprises tapes or straps which are wrapped around the folded liner. The tapes or straps may be adhesive in nature, and may be applied at spaced intervals. The said tapes or straps preferably are of a nature so as to have good tensile strength in the direction of the length of the tapes or straps, and poor tear strength in a direction at right angles to the length of the tapes or straps so that they will tear readily by virtue of the rope, cable or the like effecting a tearing force thereon as the rod is pulled back out of the pipeline or passageway.

The leading end of the rod may be provided with a head with a groove to recieve a retaining strip which is adhesive in nature, said strip being adhered to the leading end of the liner, and being wrapped around the said head and anchored in relation to the leading end of the rod. By this means, the strip will serve as a pulling means when the rod is forced into the pipeline or passageway to pull the lining tube along with a rod into the pipeline or passageway, but when the rod is retracted after insertion of the liner, the said strip will peel away from the liner leaving it in position.

Where the pipeline or passageway is a lateral pipe connection, the head on the rod may be such as to contact the opposite side of the main sewer pipe when the rod is fully inserted, which will ensure the accurate positioning of the liner in relation to the lateral pipe.

When the lateral pipe has been inserted, and the rod has been retracted, the lining may be inflated up to size by means of an expansion tube or hose which can be everted directly into the liner accurately in place in the pipeline or passageway.

The expansion tube or hose may be everted into the pipeline or passageway using any suitable fluid such as a gas or liquid or a combination of same, but regardless of the fluid used, the liner will be held in the inflated condition on the pipeline or passageway surface until curing of the resin takes place.

Equally, the liner may be of any suitable construction as long as it is provided with at least one layer of resin absorbent material which is impregnated with curable synthetic resin which can be cured or will cure when the liner is inflated onto the pipeline or passageway surface.

An embodiment of the present invention will now be described, by way of example, with reference to the accompanying diagrammatic drawings, wherein.

Figure 1:
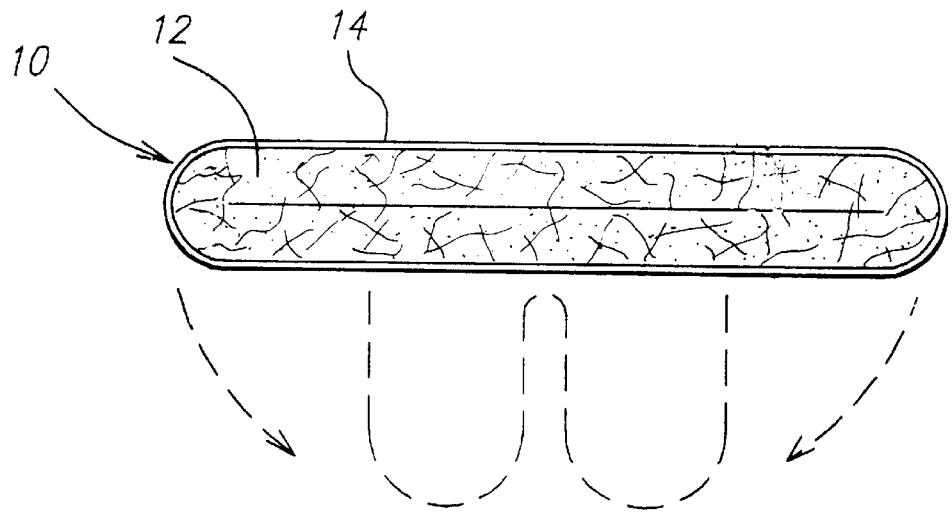
FIG. 1 shows a sectional elevation of a known flexible liner construction, which is suitable for use in connection with the method hereinafter described.

Referring to the drawings, and firstly to FIG. 1, a flexible tubular liner 10 has the configuration shown and comprises an inner layer 12 of resin absorbent material such as a needled felt in one or more layers, and to the outside of the absorbent material is an integral impermeable coating 14 comprising for example polyurethane film or the like. The liner in this condition is flexible, and although the layer 12 is thoroughly impregnated with a curable synthetic resin, the liner remains flexible until the resin cures. It is shown in a flattened condition which is the normal form it will take, but when it is applied to a pipeline or passageway surface, it is inflated into circular form or to the form of the passageway cross section.

Figure 3:
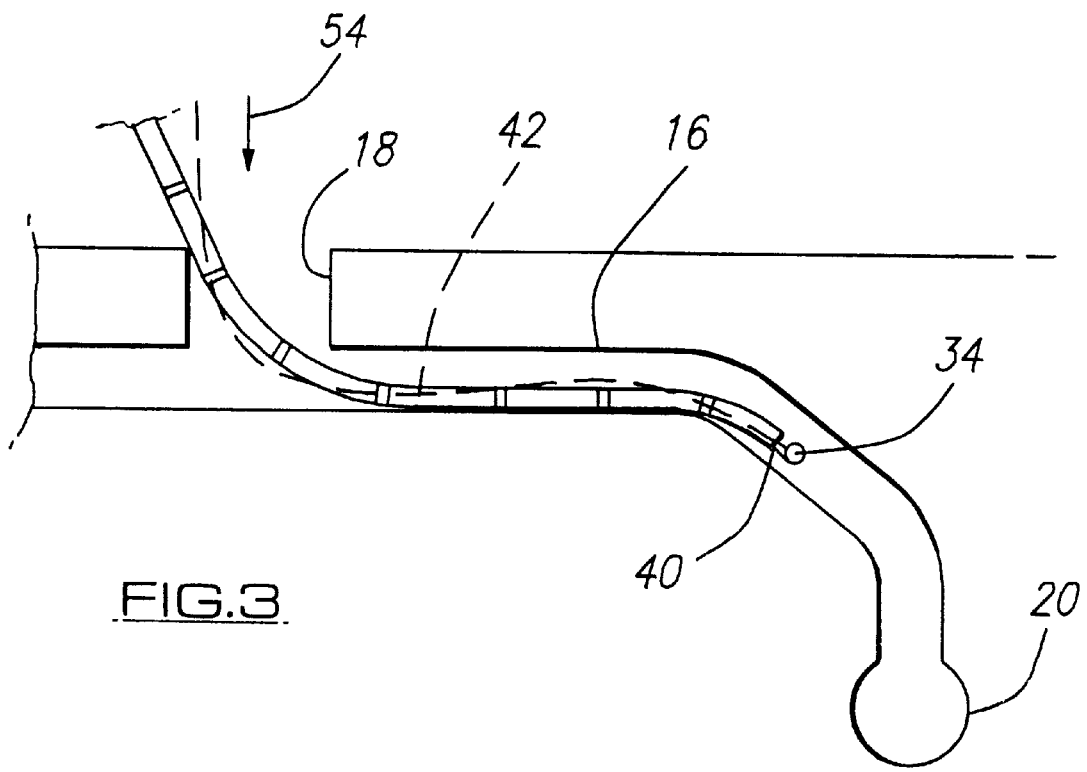
FIG. 3 shows an initial stage of the operation of inserting the liner into a lateral pipeline.

In this method, the liner 10 is open at each end, and it is specifically for insertion into a lateral pipeline or passageway 16 as shown in FIG. 3 which extends from ground level through a service connection 18 (which may be the inside of a domestic dwelling) to a main line underground sewer 20. The lateral passageway 16 is shown in this case as having two bends, but it may be straight or it may be curved or have a smaller or greater number of bends.

The liner 10 is dimensioned to the size of the lateral passageway 16 which it is to line, and in this embodiment, the liner 10 is in fact folded as shown in FIG. 1 by dotted lines into a U-shaped configuration. Before it is so folded however, at one end, the leading end, which is illustrated by reference numeral 22 in FIG. 6, has the outer film 14 provided with slits 24, so that the said end can flare bell-like when the liner is inserted as will be explained hereinafter. Additionally, at the leading end 22, at the extremity thereof there is applied by any suitable means a terminal strip 26 which locks into the main sewer pipe 20 as will be explained, and spaced from the strip 26 is applied a sealing ring 28 which may be a hydrotite sealing ring to seal against the surface of the pipeline or passageway 16 and to prevent roots from growing along the interface between the liner and the passageway surface.

Figure 2:
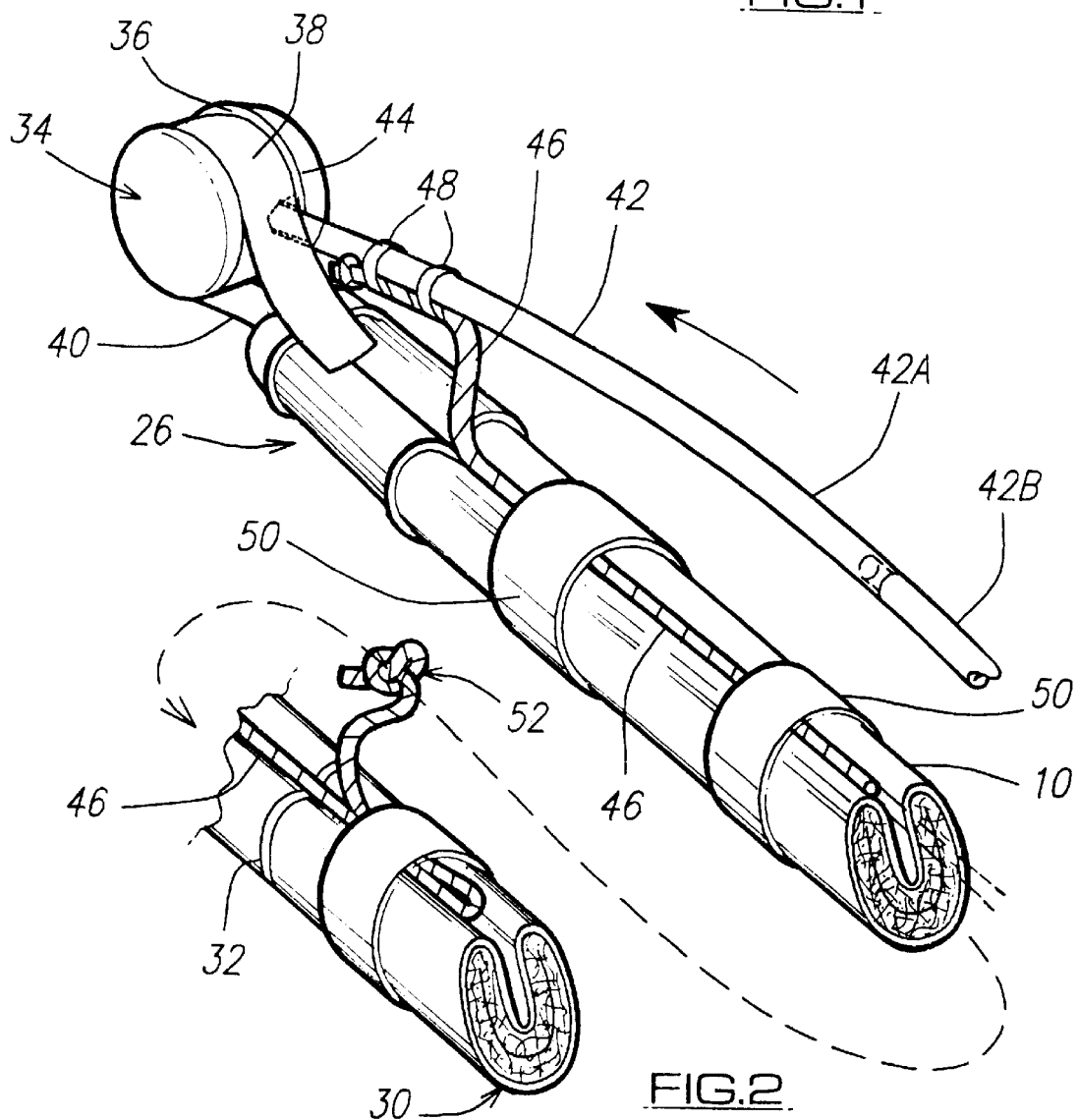
FIG. 2 shows the leading and trailing ends of the liner of FIG. 1 with the insertion apparatus coupled thereto.

The trailing end which is illustrated in FIG. 2 by reference numeral 30 is provided with a similar sealing ring 32 which is spaced inwardly of the extremity of the end 30.

The strip 26 may be applied by any suitable aggressive adhesive to ensure firm anchorage to the outer surface of the liner 10.

To the leading end 26 of the liner is further attached an insertion apparatus of which the main elements are shown in FIG. 2. This apparatus comprises a strap retaining ball 34 which has a circumferential and diametrically arranged groove 36 in which is received a glass fibre tape length 38 having adhesive on each side thereof. The tape 38 lies in the groove 36 and is adhered to the ball 34, but in addition an end 40 of the tape 38 is applied to the outer surface of the liner 10 so as to adhere thereto. This length 40 lies inside the liner when it is formed to U configuration as shown in FIG. 1.

The ball 34 is carried on the end of an insertion rod 42 which is screwed to the ball at 44 as shown. The rod 42 may be made up in lengths 42A, 42B which are screwed together so that the rod can be of any suitable length for pushing the liner into position. It is appreciated that the rod 42 must be capable of applying a considerable thrust force to insert the liner into the pipeline or passageway, but also must be of sufficient flexibility so that it can follow the contour of the curves in the passageway 16.

The rod 42 is at least as long as the liner, and preferably longer as it will be manipulated from ground level to push the liner into position as will be described hereinafter.

Finally, attached to the leading end of the rod 42 is a pull back rope 46 which is attached to the rod 42 by cable ties or adhesive strips 48 or the like.

The pull back rope 46 lies in the inside of the U formed by folding the liner as shown in FIG. 1, and is also shown in FIG. 2, and finally the liner 10 is held in U-shaped configuration by means of retention tapes 50 which are of a nature having good longitudinal strength, but relatively poor transverse tear strength so that as will be explained hereinafter, the rope 46 can cut through the tapes 50 to release them when the lining tube 10 has been placed in position.

At the trailing end 30, the rope 46 is folded back on itself as shown in FIG. 2, and at its extremity it is provided with a holding knot 52.

Figure 4:
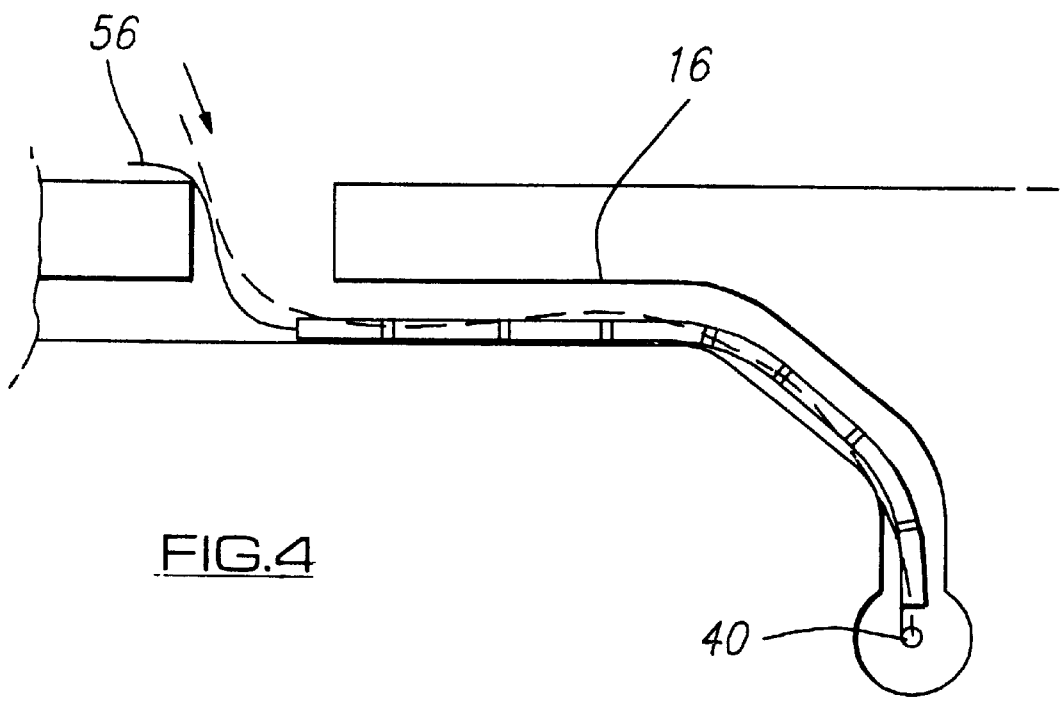
FIG. 4 shows the completion of the insertion operation.
Figure 5:
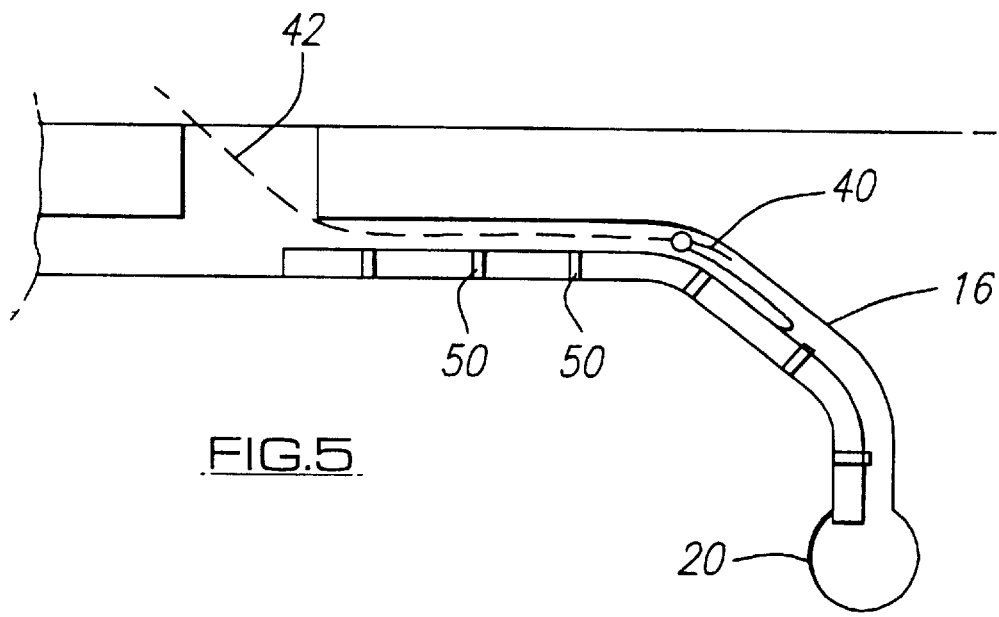
FIG. 5 shows how the insertion apparatus is retracted and the function it performs in this retraction, leaving the liner in place ready to be inflated.

FIGS. 3, 4 and 5 illustrate the insertion method diagrammatically. The leading end of the liner tube when folded as shown in FIG. 2 is inserted into the pipeline or passageway 16 from the service connection 18 by pushing on the rod 42 by indicated by arrow 54. The ball 34 is the leading element in this insertion process, and by virtue of the force on the rod 42, indicated in dotted lines in FIGS. 3, 4 and 5, and through the medium of the pull tape 40, the liner is forced into and along the passageway 16. FIG. 4 shows the liner fully in position, and it will be appreciated that its length dimension is such as to cover the surface of the liner to be lined. FIG. 4 also illustrates that a hold back rope 56 may be attached to the trailing end of the liner in order to control the in-feed of the liner so that it does not "run away" under the effects of gravity and so that it can be pulled back if necessary.

Figure 6:
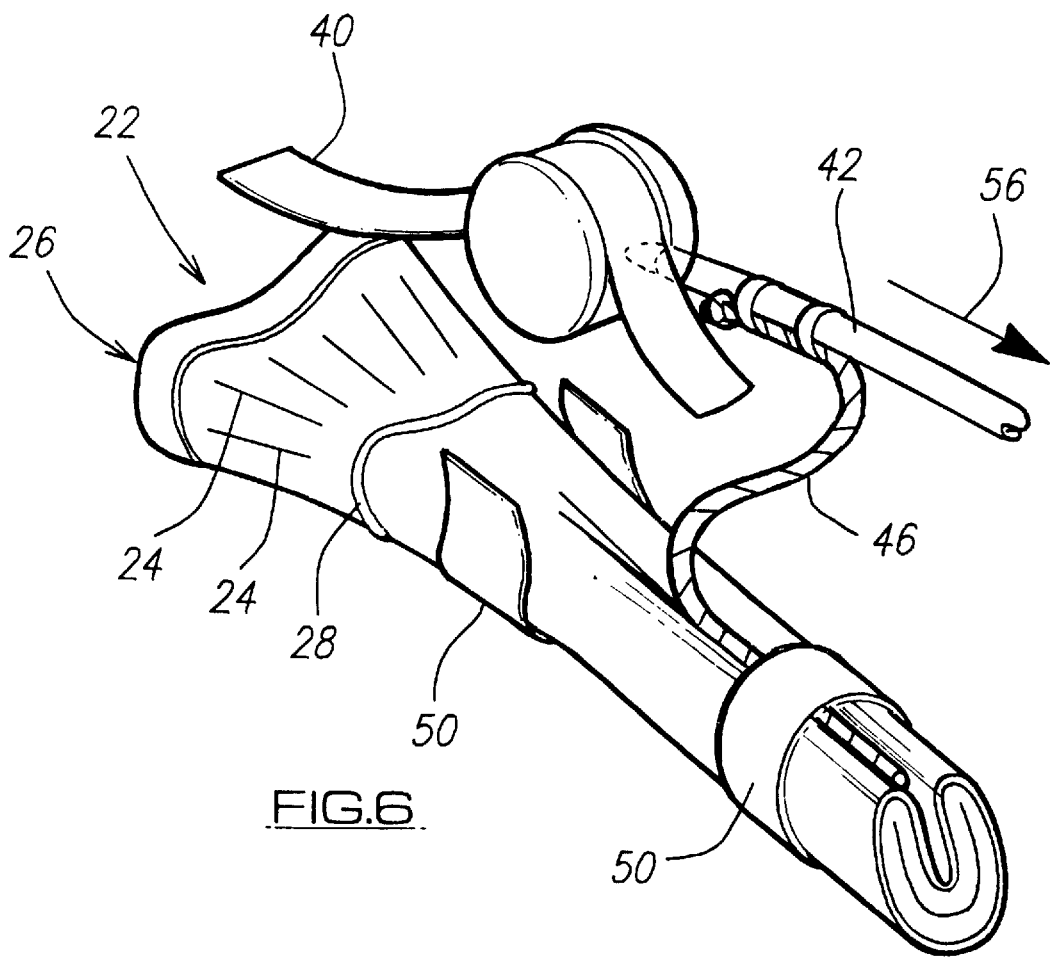
FIG. 6 is a perspective view showing the inner end of the liner and the insertion apparatus in the course of being retracted.

When the liner is in position as shown in FIG. 4, it is simply a matter of pulling the rod 42 rearwards, which has the effect of pulling back the rope 46 in a manner such that as illustrated in FIG. 6, the rope folds back upon itself. A number of effects take place at the leading end of the liner and the first is that the rope 46 cuts through the first retention tape 50 as shown in FIG. 6, and then the end of the connecting strip 40 is peeled away from the leading end of the liner. Arrow 56 in FIG. 6 illustrates the direction in which the rod 42 is pulled back. As the rod continues to be pulled back so it breaks the tapes 50 sequentially, and FIG. 5 shows the rod 42 retracted rearwardly by approximately half the length of the passageway 16 to be lined. The rod 42 is simply continued to be pulled rearwardly so that all of the holding tapes 50 are severed, and the liner is now in position ready to be inflated.

The rearmost holding tape 50 may be double wrapped in order to retain the folded over portion of the rope 46, which facilitates the breaking open of the last holding tape and the retention of the rope end.

The assembly is in fact made up in the form described under factory conditions, and can be delivered to site, or assembly can take place on site.

Where appropriate and where possible, the leading end of the liner tube 10 may be provided with a pull rope which leads through the main sewer and to a location where pulling can take place in order to assist the in-feed of the lining tube 10.

When the lining tube is being inserted, if the passageway 16 does have a number of bends as illustrated, insertion may be assisted by a pull-in rope as described, and a remote controlled camera may be utilized for checking when the lining is in the correct position. These are established techniques. Some bouncing or back and forth thrusting of the push rod may be required in order to assist the insertion process should it be that the lining and push rod become locked or frictionally stuck against the passageway surface.

Figure 7:
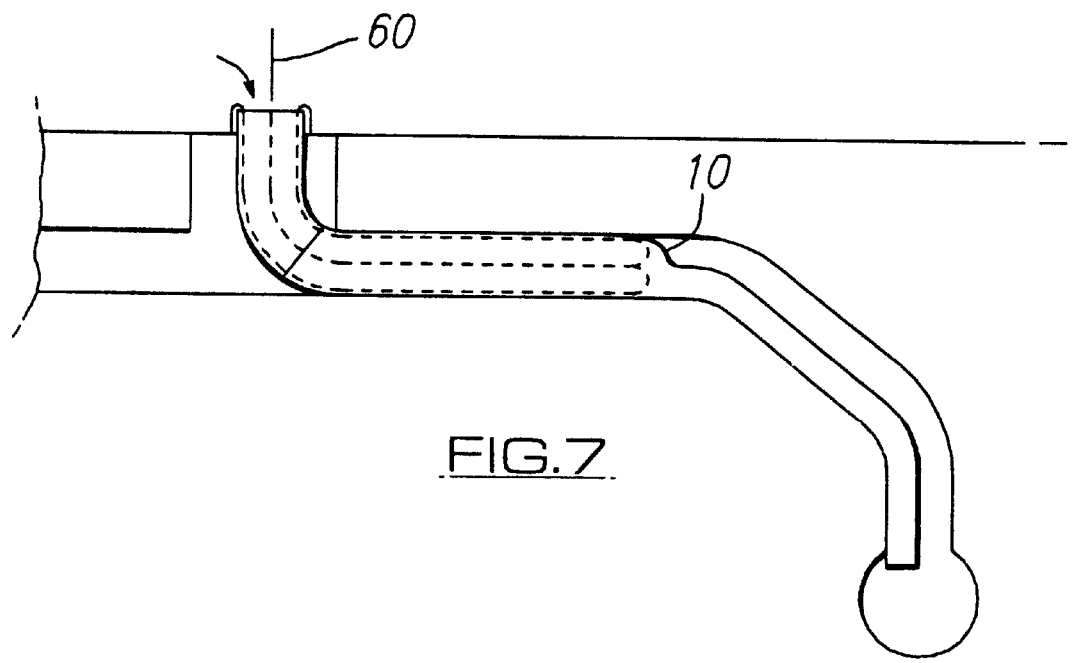
FIG. 7 shows the liner when placed in the lateral pipeline and in the course of being inflated to form the final lining.
Figure 9:
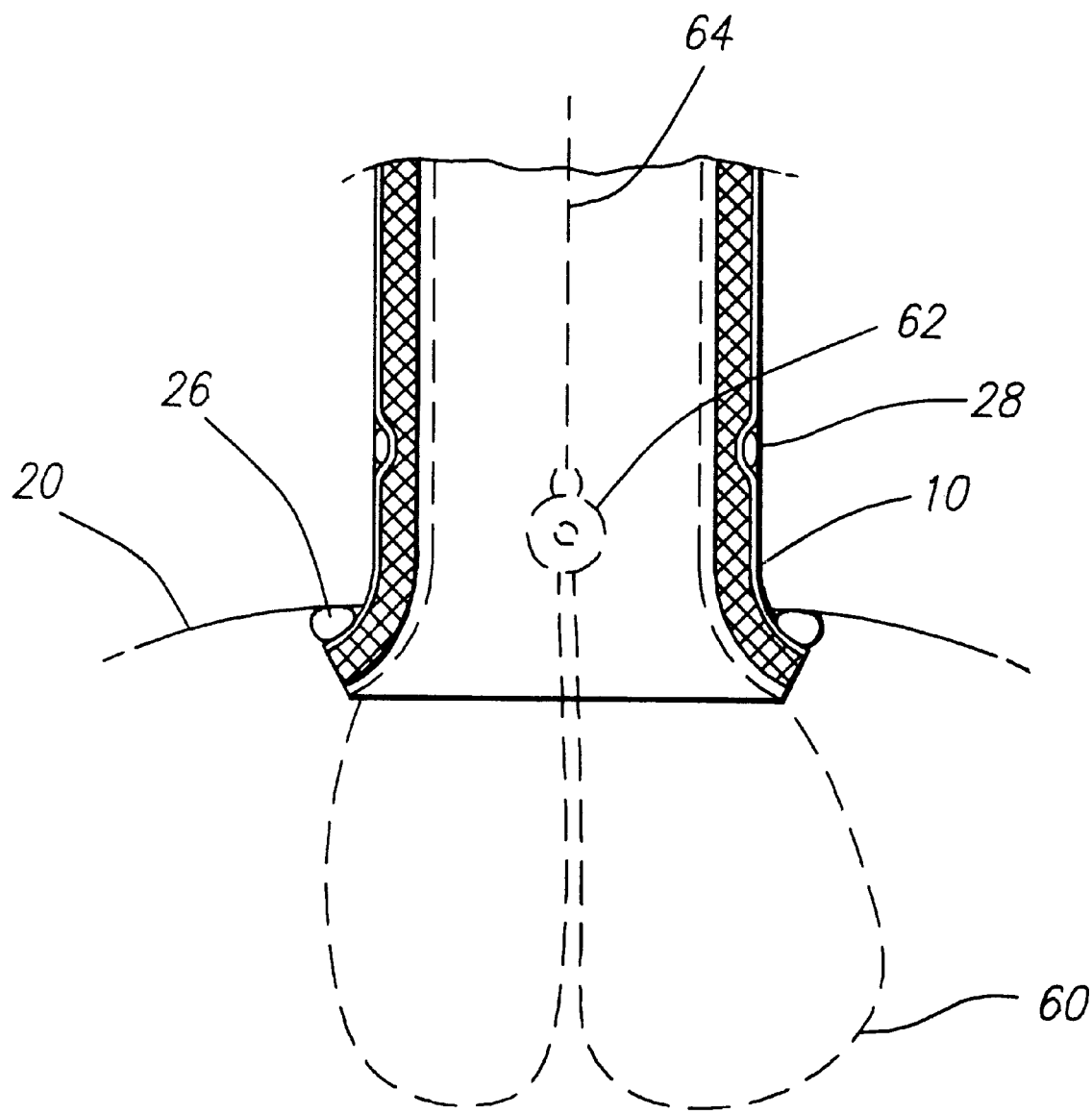
FIG. 9 shows the leading end of the liner when similarly inflated.

When the lining is in position as illustrated in FIG. 5, it then has to be inflated as shown in FIG. 7. This inflation procedure is in fact conventional insofar as an inflation tube 60 is everted into and along the inside of the lining tube 10 as shown in FIG. 7. The inflation tube is dimensioned and inflated so that when the inflation step has been completed, as shown in FIG. 9, the leading end of the inflation tube 60 projects into the main sewer 20, thereby flaring the leading end of the lining tube 10 as shown in FIG. 9. The strip 26 which is applied to the outside of the lining tube 10 as described in relation to FIG. 6 therefore forms an anchor or catch on the surface of the main sewer 20 so that an effective positioning and location of the lining tube 10 is achieved. Said strip 20 incidentally may comprise a strip of felt material which itself is impregnated with a curable synthetic resin, so that a hard collar will eventually form in the vicinity of the junction between the lateral passageway and the main sewer 20. The trailing end of the inflation tube 60 is in fact belled out to give the effect described.

The said trailing end of the inflation tube 60 further has a shackle or like coupling 62 connected thereto, and a pull back rope 64 is connected to the shackle. When the lining operation has been complete therefore, the inflation tube 60 which may comprise a silicone coated fabric hose, can be pulled back so that the hose inverts and is peeled away from the cured lining.

Where the resin is of a type which cures naturally i.e. it is an ambient cure resin, the inflation medium for the tube 60 may be any suitable such as air or water, but should it be that the resin requires heat to initiate and/or effect its cure, then a heated inflation medium should be used. Such medium may comprise hot water or steam or any other suitable fluid medium. The fluent medium may be inserted by any suitable apparatus and structure erected at ground level and it may assist in the performing of the inflation if the inflation tube is everted part way into the trailing end of the lining tube before it is folded and assembled and inserted as described in relation to FIGS. 3 to 5.

Where hot water is used for the inflation, it may be hot water at a 160° C. which is used in conjunction with a silicone inflation tube. A suitable pumping apparatus may be adopted for example as described in our co-pending U.K. Patent application filed Dec. 16, 1993 and the inflation tube may require to be bounced so as to assist the inflation, by cyclically varying the pressure level inside the inflation tube. It is to be noted that control of the inflation tube should be effected so that it does not "run away" during the inflation operation. When the inflation tube has been fully inserted, the hot water is maintained in the inflation tube, and maybe circulated if desired, to maintain the temperature, until the resin in the lining tube has cured sufficiently hard so that the lining tube forms a cured hard lining which remains firmly in position when the inflation tube is removed.

Figure 8:
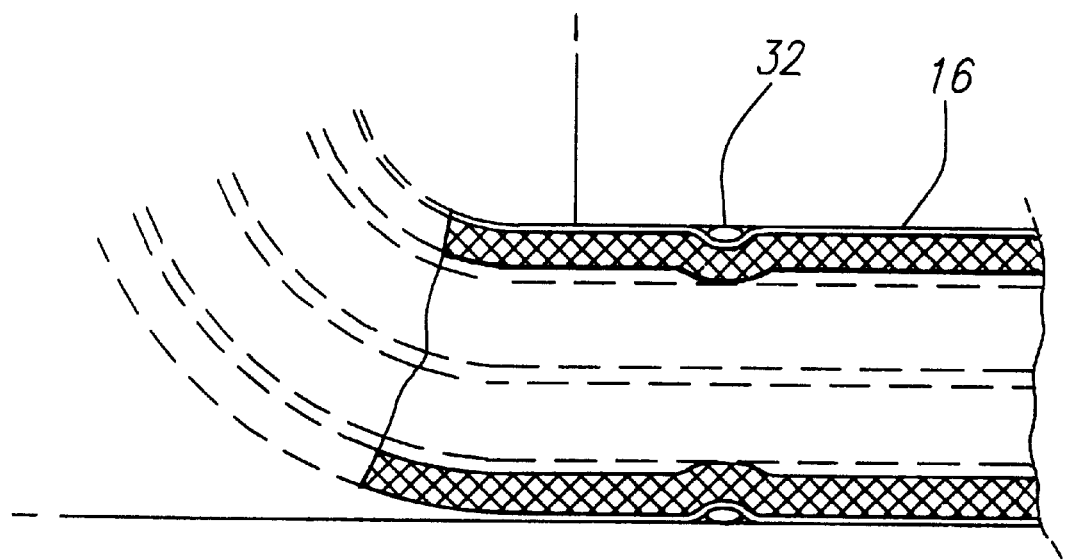
FIG. 8 shows the trailing end of the liner when inflated onto the lateral passageway surface.

FIG. 8 shows the trailing end of the lining tube when inflated, and illustrates how the hydrotite sealing ring 32 forms a seal against the passageway surface. FIG. 9 illustrates how the leading end sealing ring 28 also seats against the pipeline or passageway surface.

If the inflation tube is simply inserted by pouring water into a suitable header apparatus, the insertion tube may be held back manually, and various push rods may be used for bouncing the tube to effect the efficient inflation of the inflation tube inside the liner tube.

Instead of using an inflation hose which is inverted into the lining tube to inflate same, an inflation tube or bladder may be provided inside the lining tube before it is inserted in the passageway. After insertion, the bladder is inflated to apply the lining tube to the passageway surface and then the bladder is peeled away by a pull back rope or the like connected thereto and removed from the passageway, for example as set forth in International Patent Application No WO 93/16320.

The invention provides an extremely effective insertion method for resin impregnated liner tubes, especially those tubes which are to line passageways such as lateral passageways, or "blind" passageways where access to the remote end of the passageway is impossible of difficult.

What is claimed is:

1. A method of lining a pipeline or passageway by means of a tubular liner, comprising:
    a) attaching one end (the leading end) of the tubular liner to one end (the leading end) of a push rod means by a a length of an adhesive retaining strip adhered to the leading end of the push rod means and to the leading end of the liner;
    b) inserting the liner in the pipeline or passageway by pushing the rod means leading end first into and along the pipeline or passageway from a near end to a distal end of the pipeline or passageway so that the rod means pulls the liner into the passageway,
    c) pulling the rod means in an opposite direction to release said adhesive retaining strip whereby the rod means is pulled from the pipeline or passageway and the liner remains in position, and
    d) inflating the liner into the pipeline or passageway to line same.

2. A method according to claim 1 wherein the liner is a length of flexible tubular liner which comprises or includes resin absorbent material which is impregnated with a curable synthetic resin and the method includes the step of curing the resin whilst the liner is inflated.

3. A method according to claim 1, wherein the adhesive retaining strip is a length of adhesive tape.

4. A method according to claim 1, wherein the liner is folded in two prior to being inserted in the pipeline or passageway and is held in such condition by strap means wrapped therearound and spaced therealong, and the strap means are broken by a rope means trapped under the strap means in that the rope means is attached to the leading end of the rod means and is retracted with the rod means, breaking the strap means as it is progressively removed from the pipeline or passageway.

5. A method according to claim 1, wherein the liner is folded in two prior to being inserted in the pipeline or passageway and is held in such condition by strap means wrapped therearound and spaced therealong, and the strap means are broken by a rope means trapped under the strap means in that the rope means is attached to the leading end of the rod means and is retracted with the rod means, breaking the strap means as it is progressively removed from the pipeline or passageway.

6. A method according to claim 1, wherein the liner is inflated by everting an inflation tube into and along the inside of the liner.

7. A method according to claim 4, wherein the liner is inflated by everting an inflation tube into and along the inside of the liner.

8. A method according to claim 5, wherein the liner is inflated by everting an inflation tube into and along the inside of the liner.

9. A method according to claim 1, wherein the leading end of the liner is flared outwardly into the main passageway by the inflation step.

10. A method according to claim 1, wherein the leading end of the liner is provided with a sealing member at the juncture where the lateral pipeline or passageway meets a main pipeline.

11. A method according to claim 10, wherein the leading end of the liner having the sealing member is flared outwardly into the main passageway by the inflation step.

12. A method according to claim 1, wherein seals are formed between the pipeline or passageway and the ends of the liner by sealing rings on the outside of the liner.

13. A method according to claim 1, wherein the length of the rod means is increased by the addition of sections thereto as it is pushed into the pipeline or passageway.

14. Apparatus for inserting a tubular liner having a leading end and a trailing end in a pipeline or passageway comprising:
   a) rod means having a leading end and a trailing end
   b) a length of adhesive retaining strip adhered to the leading end of the rod means and to the leading end of this liner, said rod and strip adapted to pull the liner into the pipeline or passageway when the rod means is pushed into the pipeline or passageway and to release the liner, to leave it in the pipeline or passageway when the rod means is pulled from the pipeline or passageway.

15. Apparatus according to claim 14, wherein the releasable adhesive retaining strip is a length of adhesive tape for attachment to the leading end of the rod means to the leading end of the liner.

16. Apparatus according to claim 14, wherein said rod means comprises a number of rod sections connected together end to end.

17. Apparatus for use in lining a pipeline or passageway comprising:
   a) a length of tubular liner having a leading end and a trailing end, said liner folded lengthwise and held folded by strap means round about the liner at spaced intervals along the length thereof;
   b) rod means having a leading end and a trailing end, said liner and rod means lying side by side,
   c) releasable attachment means connecting the leading end of the rod means with the leading end of the liner, said releasable attachment means adapted to pull the liner into the pipeline or passageway when the rod means is pushed into the pipeline or passageway and to release the liner, to leave it in the pipeline or passageway when the rod means is pulled from the pipeline or passageway; and
   d) a fracturing rope extending along the liner and positioned under the strap means, the rope connected to the rod means at the leading end thereof.

18. Apparatus according to claim 17, wherein the liner is a length of flexible tubular liner which comprises or includes resin absorbent material which is impregnated with a curable synthetic resin.

19. Apparatus according to claim 18, wherein the releasable attachment means comprises a member carrying adhesive tape which is attached to the liner.

20. Apparatus according to claim 19, wherein the member comprises a ball having a groove thereon receiving said tape.

21. Apparatus according to claim 17, wherein said rod means comprises a number of rod sections connected together end to end.

* * * * *